(12) United States Patent  (10) Patent No.: US 6,441,989 B2
Nagatsuka  (45) Date of Patent: Aug. 27, 2002

(54) RECORDING AND/OR REPRODUCING APPARATUS INCLUDING A TAPE GUIDE DEVICE

(75) Inventor: Osamu Nagatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/144,410

(22) Filed: Sep. 2, 1998

(30) Foreign Application Priority Data

Sep. 9, 1997 (JP) .......................................... 09-243853

(51) Int. Cl.[7] .............................................. G11B 15/60
(52) U.S. Cl. ..................... 360/85; 219/121.63
(58) Field of Search ...................... 360/85, 93, 130.21, 360/130.22, 130.23, 130.2, 95, 83, 84, 96.1, 96.2, 96.3; 219/121.63, 121.64, 126.6, 121.61, 121.62, 121.65, 121.66

(56) References Cited

U.S. PATENT DOCUMENTS

| | | | | |
|---|---|---|---|---|
| 3,679,840 A | * | 7/1972 | Maxey | 179/100.2 T |
| 4,017,897 A | * | 4/1977 | Blanding | 360/7 |
| 4,616,274 A | * | 10/1986 | Nagaoka | 360/1 |
| 5,305,162 A | * | 4/1994 | Kushiro et al. | 360/85 |
| 5,349,485 A | * | 9/1994 | Lin et al. | 360/85 |
| 5,636,080 A | * | 6/1997 | Konishi et al. | 360/95 |
| 5,731,925 A | * | 3/1998 | Kobayashi | 360/85 |
| 5,880,904 A | * | 3/1999 | Mizoshita et al. | 360/97.01 |
| 5,920,445 A | * | 7/1999 | Angellotti et al. | 360/266.6 |
| 5,949,609 A | * | 9/1999 | Hashimoto et al. | 360/85 |
| 6,038,100 A | * | 3/2000 | Nagatsuka | 360/96.6 |

FOREIGN PATENT DOCUMENTS

| | | | | |
|---|---|---|---|---|
| JP | 401211350 A | * | 8/1989 | |
| JP | 405250772 A | * | 9/1993 | 360/130.21 |
| JP | 406044737 A | * | 2/1994 | 360/130.21 |
| JP | 406076427 A | * | 3/1994 | 360/130.21 |
| JP | 406223452 A | * | 8/1994 | 360/130.21 |
| JP | 11-86386 | * | 3/1999 | |

* cited by examiner

Primary Examiner—Brian E. Miller
Assistant Examiner—Tianjie Chen
(74) Attorney, Agent, or Firm—Robin, Blecker & Daley

(57) ABSTRACT

A tape guide device for guiding tape includes a base in which a hole is formed, and a guide post having at one end thereof a smaller-diameter portion than another portion, at least part of the smaller-diameter portion being fitted in the hole of the base, and the guide post and the base being fused to each other in the smaller-diameter portion.

10 Claims, 5 Drawing Sheets

RECORDING AND/OR REPRODUCING APPARATUS INCLUDING A TAPE GUIDE DEVICE

BACKGROUND OF THE INVENTION

1. Field of the Invention

The present invention relates to a tape guide device for guiding the running of a tape-shaped recording medium which is represented by magnetic tape or the like.

2. Description of Related Art

In general, magnetic tape which is used in a recording and/or reproducing apparatus such as a VTR forms a running path by being guided by a tape guide device.

FIGS. 6 and 7 show one example of a tape guide device which is used in a conventional recording and/or reproducing apparatus. FIG. 6 is a plan view of the tape guide device, while FIG. 7 is a cross-sectional side elevational view of the tape guide device.

In the tape guide device shown in FIGS. 6 and 7, a bush 63, a guide post 62 and a shaft 64 are secured to a base 61. The bush 63 defines the turning center of the base 61, the guide post 62 serves to guide magnetic tape while allowing the magnetic tape to slide past the guide post 62, and the shaft 64 serves to turn the base 61.

If the shaft 64 is operated, the entire base 61 turns about the turning center defined by a central axis O of the inner diameter of the bush 63, whereby the running path of the magnetic tape which slides on the periphery of the guide post 62 can be determined.

These members 63, 62 and 64 which are secured to the base 61 have conventionally been fastened to the base 61 by caulking with so-called high speed steel pins.

However, in such conventional example, a radius $R_1$ of the peripheral portion of a hole 61a of the base 61 into which to insert the guide post 62 needs to be made larger than a radius $R_G$ of the guide post 62 so that a sufficient strength for caulking can be maintained.

For this reason, to prevent other component parts from interfering with the tape guide device, it is necessary to make the component parts distant from the radius $R_G$ of the guide post 62 and also from the radius $R_1$ of the peripheral portion of the hole 61a. This necessity is an obstacle to a further miniaturization of the recording and/or reproducing apparatus, and reduces the freedom of design of the same.

In recent years, the recording and/or reproducing apparatus has been being miniaturized more and more, and the required precisions of individual parts to be used in such apparatus have being becoming more and more strict. Under such situation, for example, in the above-described conventional example shown in FIG. 7, the relative inclination of the central axis O' of the guide post 62 with respect to the turning central axis O of the base 61 is strictly required to be not greater than 15 minutes in angle.

However, with the conventional securing method using caulking, it has occasionally been impossible to secure individual members while ensuring the highly accurate positional relationship therebetween, because of a deformation, a positional deviation or the like of part of the members during caulking. In such a case, after a caulking process, it becomes necessary to correct the relative inclination by manual bending while measuring the inclination of the central axis O' with respect to the turning central axis O, and this necessity leads to problems such as an increase in the total number of processes and an increase in cost.

BRIEF SUMMARY OF THE INVENTION

An object of the present invention is to improve a method of securing members which constitute a tape guide device and highly accurately and stably providing a tape guide device suited to miniaturization.

To achieve the above-described object, in accordance with one embodiment of the present invention, there is provided a tape guide device for guiding tape, which comprises a base in which a hole is formed, and a guide post having at one end thereof a smaller-diameter portion than another portion, at least part of the smaller-diameter portion being fitted in the hole of the base, and the guide post and the base being fused to each other in the smaller-diameter portion.

In accordance with another aspect of the present invention, there is provided a recording and/or reproducing apparatus which comprises a rotary cylinder having a plurality of heads for recording and/or reproducing information on and/or from tape, cassette mounting means for mounting a cassette in which tape is accommodated, and a tape guide device for guiding tape which includes a base in which a hole is formed, and a guide post having at one end thereof a smaller-diameter portion than another portion, at least part of the smaller-diameter portion being fitted in the hole of the base, and the guide post and the base being fused to each other in the smaller-diameter portion.

The above and other objects, features and advantages of the present invention will become apparent from the following detailed description of a preferred embodiment of the present invention, taken in conjunction with the accompanying drawings.

DETAILED DESCRIPTION OF THE INVENTION

A preferred embodiment of the present invention will be described below in detail with reference to the accompanying drawings.

Figure 1:
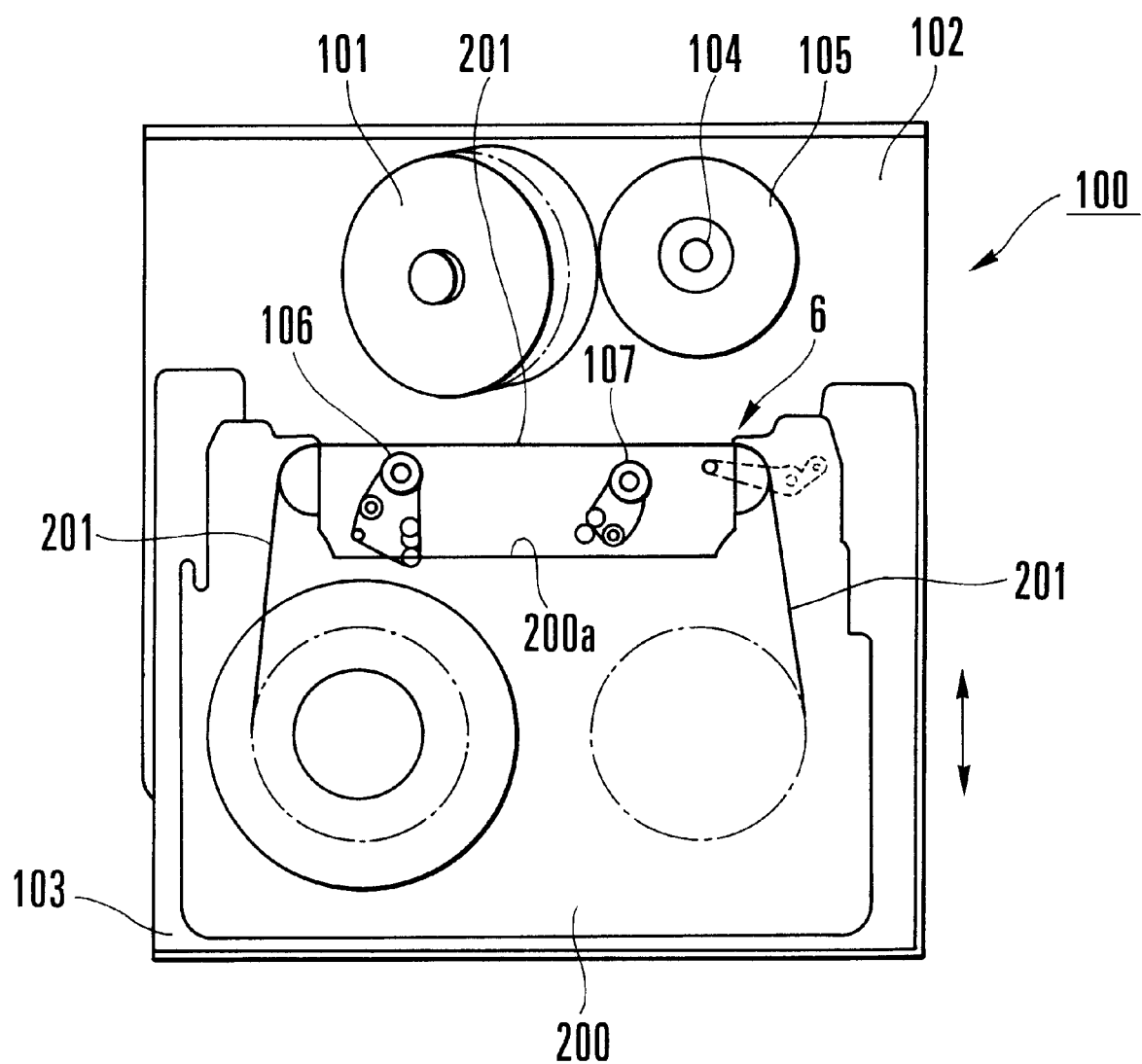
FIG. 1 is a schematic view of the entire construction of a recording and/or reproducing apparatus to which a tape guide device according to the present invention is applied.
Figure 2:
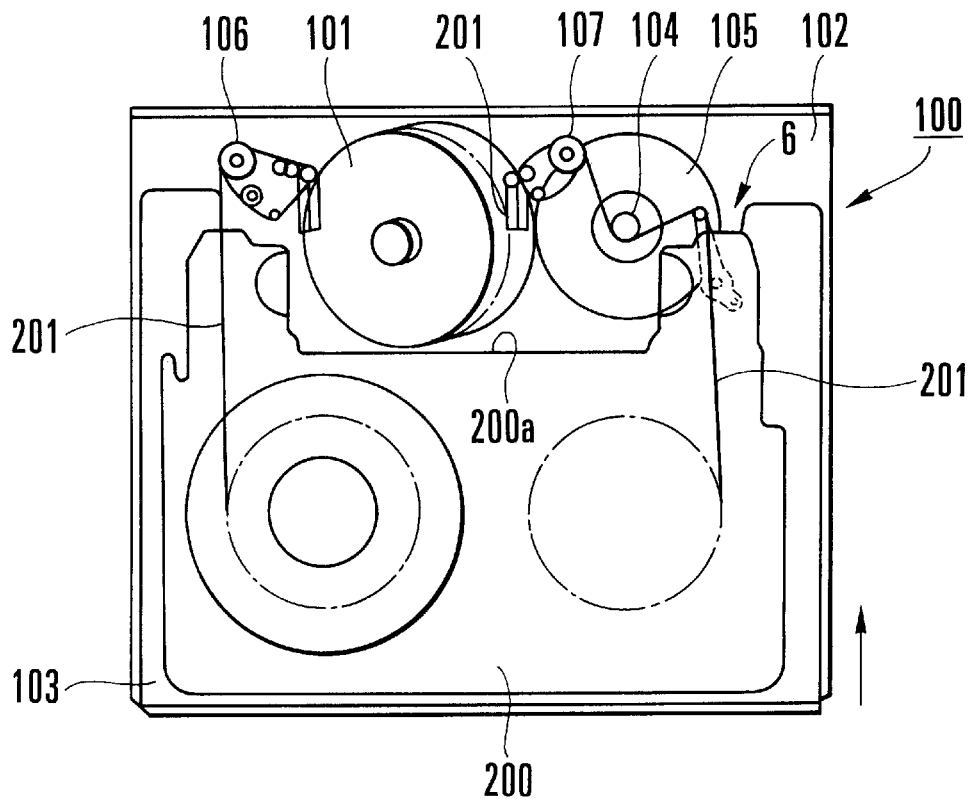
FIG. 2 is a schematic view of the entire construction of the recording and/or reproducing apparatus to which the tape guide device according to the present invention is applied.

First of all, one example of the entire construction of a recording and/or reproducing apparatus to which a tape guide device according to the present invention is applied will be described below. Referring to FIGS. 1 and 2, a recording and/or reproducing apparatus 100 is provided with a rotary cylinder device 101. This rotary cylinder device 101 is disposed at a predetermined position of a main chassis 102, and tape reels and the like are disposed on a slidable chassis 103 which are arranged for sliding motion (refer to the double-headed arrow shown in FIG. 1) with respect to the main chassis 102. Specifically, in this example, the main chassis 102 and the slidable chassis 103 are arranged as separate structures in such a manner that a tape cassette 200 mounted on the slidable chassis 103 (a cassette mounting member) is made to move toward and away from the rotary cylinder device 101 (i.e., between the state shown in FIG. 1 and the state shown in FIG. 2).

The recording and/or reproducing apparatus 100 also includes a capstan 104, a capstan motor 105, a tape loading device 106 for drawing tape from the tape cassette 200 on the tape entrance side of the rotary cylinder device 101, a tape loading device 107 for drawing tape from the tape cassette 200 on the tape exit side of the rotary cylinder device 101, and the like. These members constitute tape guide means for forming a tape path.

In the tape loading operation of the recording and/or reproducing apparatus 100, after the tape cassette 200 has been mounted on the slidable chassis 103 as shown in FIG. 1, magnetic tape 201 is drawn from an opening portion 200a of the tape cassette 200 by the tape loading device 106 and the tape loading device 107 and, at the same time, the slidable chassis 103 slides toward the rotary cylinder device 101. Then, as shown in FIG. 2, the rotary cylinder device 101 is relatively disposed in the opening portion 200a, and the magnetic tape 201 is wrapped around the peripheral surface of the rotary cylinder device 101 by the tape loading device 106 and the tape loading device 107.

The above-described tape guide means also includes a tape guide device 6 as shown in FIGS. 1 and 2. The tape guide device 6 is turnably secured to the slidable chassis 103, and is arranged to turn by a predetermined angle with the tape loading operation to draw the magnetic tape 201 in a predetermined direction so that the magnetic tape 201 can travel past the capstan 104. Thus, the recording and/or reproducing apparatus 100 is capable of effecting recording or reproduction while causing the magnetic tape 201 to run along a predetermined tape path.

Figure 3:
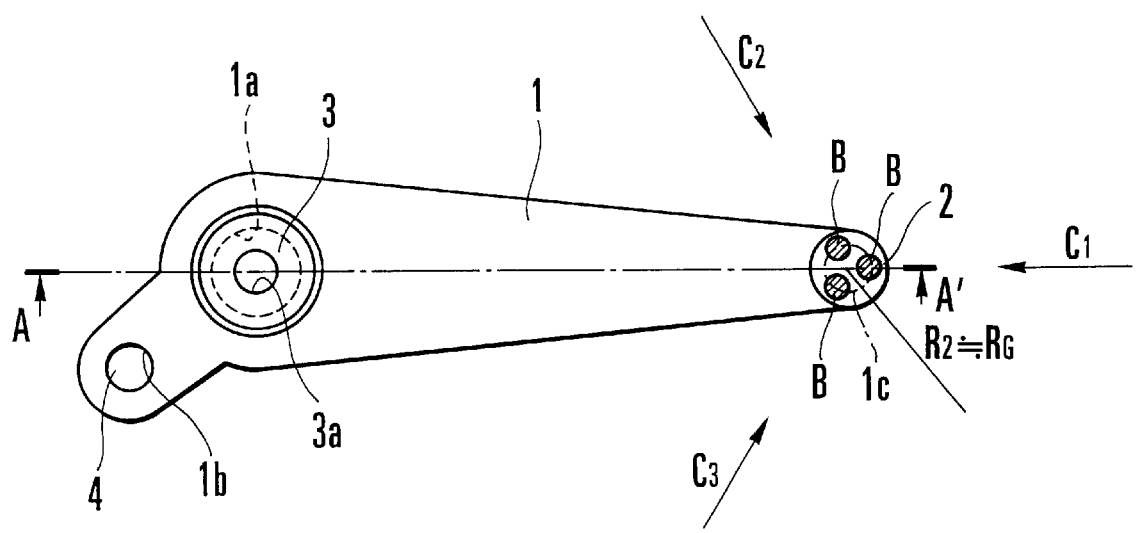
FIG. 3 is a plan view of the tape guide device according to the present invention.
Figure 4:
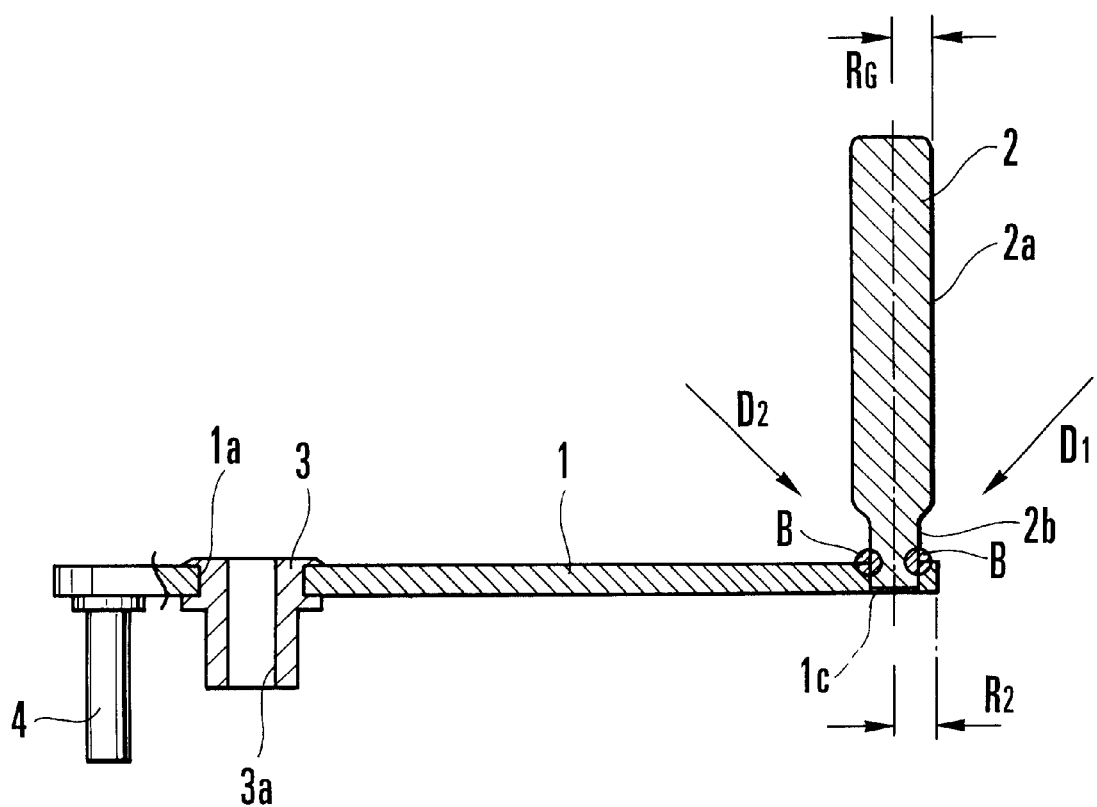
FIG. 4 is a cross-sectional view taken along line A-A' of FIG. 3, showing the tape guide device according to the present invention.

FIGS. 3 and 4 show details of the tape guide device 6. FIG. 3 is a plan view of the tape guide device 6, while FIG. 4 is a cross-sectional side elevational view (taken along line A-A' of FIG. 3). As is apparent from FIGS. 3 and 4, the tape guide device 6 includes a base 1, a guide post 2, a bush 3 and a drive shaft 4.

The base 1 is formed by working, for example, a stainless steel plate, and the bush 3 which serves as the rotational center of the base 1 is secured in a hole 1a. The drive shaft 4 for turning the base 1 is secured in a hole 1b positioned in the vicinity of the hole 1a.

The guide post 2 which is inserted in a hole 1c is secured at a lengthwise end of the base 1. The guide post 2 is a shaft made of the same kind of material as the base 1, and has a smaller-diameter portion 2b which is reduced in diameter compared to an outer-diameter portion 2a which serves as a sliding surface for the magnetic tape 201.

The smaller-diameter portion 2b is inserted in the hole 1c to a predetermined position, and the smaller-diameter portion 2b and the edge of the hole 1c are fixed to each other by being fused together by laser. As shown in FIGS. 3 and 4, it is preferable that portions B which are fused portions be located at about several positions which are spaced at equal intervals around the periphery of the smaller-diameter portion 2b of the guide post 2.

Since the base 1 and the guide post 2 are fixed to each other by laser welding, the shape of the base 1 can be made small, as compared with a conventional fixing method using caulking. This is because, in the process of laser welding, since unnecessary external force does not act on the base 1 nor the guide post 2, the peripheral portion of the hole 1c into which to insert the guide post 2 can be made thin to a thinness limit.

Accordingly, in the present embodiment, a radius $R_2$ of the arc of the peripheral portion is made approximately equal to a radius $R_G$ of the outer-diameter portion 2a which serves as the magnetic-tape sliding surface of the guide post 2. In this construction, since the lengthwise end of the base 1 does not project from the outer-diameter portion 2a of the guide post 2, members to be disposed in the vicinity of the guide post 2 can be brought into very close proximity with the outer-diameter portion 2a of the guide post 2. Accordingly, the entire recording and/or reproducing apparatus can be made small.

As is apparent from FIGS. 3 and 4, since the projections (the portions B) formed by laser welding do not project from the outer-diameter portion 2a of the guide post 2, even if the magnetic tape 201 shifts downward as viewed in FIG. 4, the lower edge of the magnetic tape 201 does not contact any of the projections so that the magnetic tape 201 is prevented from being damaged. In addition, since portions such as those shown in FIG. 4 are subjected to laser welding, the lower end of the guide post 2 does not project from the lower surface of the base 1 so that the clearance between the lower surface of the base 1 and the slidable chassis 103 can be made small to reduce the thickness of the recording and/or reproducing apparatus to a further extent.

Figure 5:
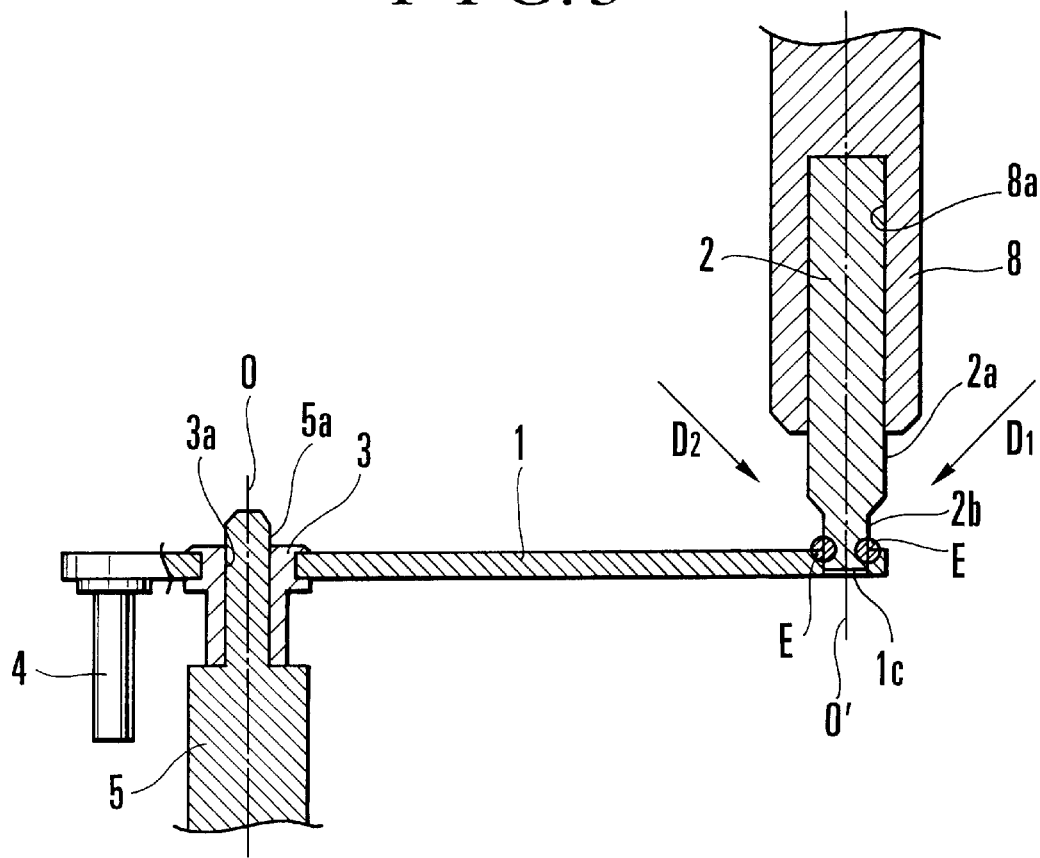
FIG. 5 is a cross-sectional side elevational view showing a manufacturing process for the tape guide device according to the present invention.
Figure 6:
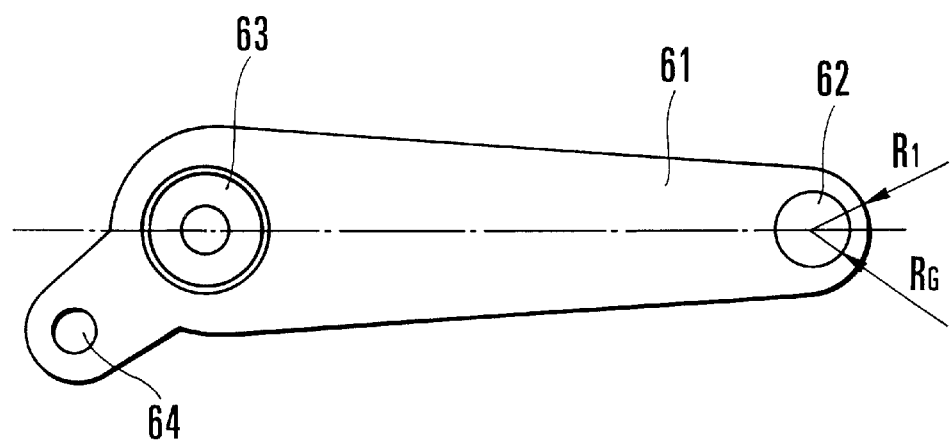
FIG. 6 is a plan view of a conventional tape guide device.
Figure 7:
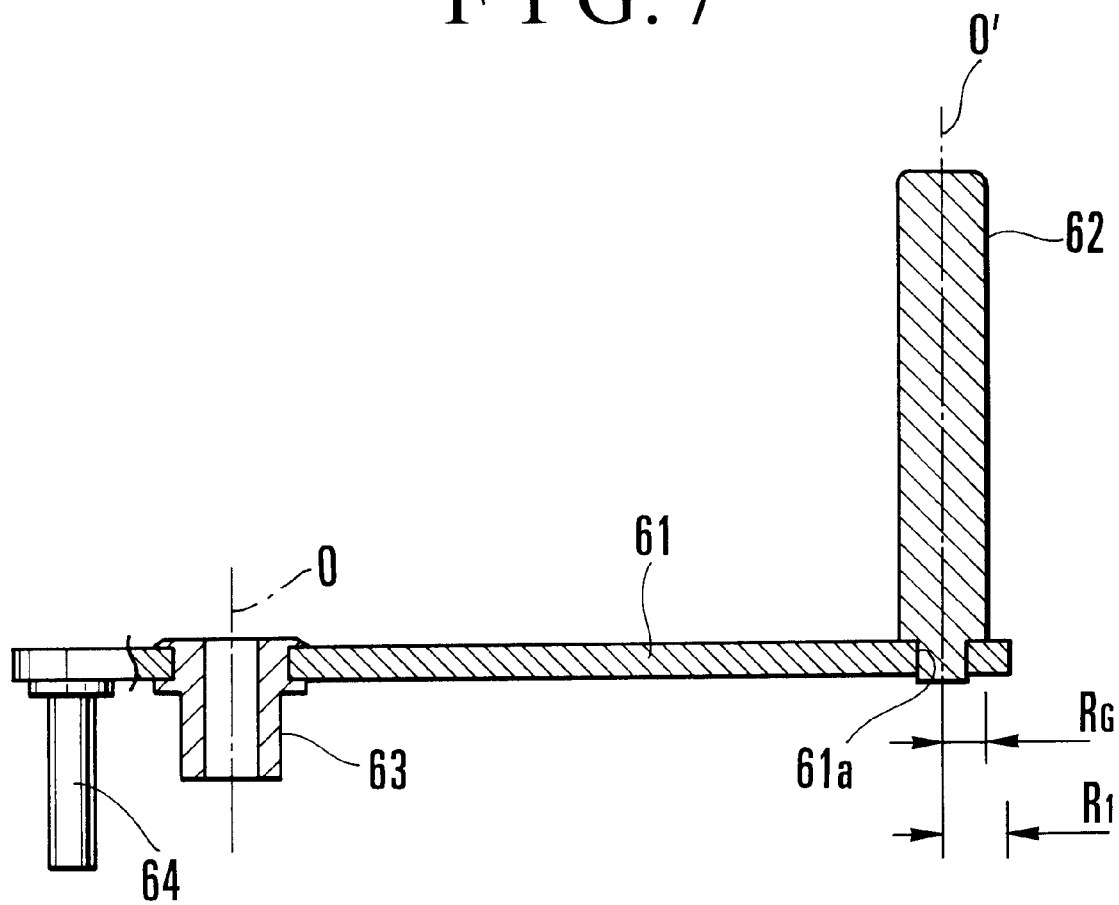
FIG. 7 is a cross-sectional side elevational view of the conventional tape guide device.

FIG. 5 is a cross-sectional side elevational view showing the manner of laser-welding the base 1 and the guide post 2. A shaft portion 5a of a jig 5 is fitted in an inner-diameter portion 3a of the bush 3. The smaller-diameter portion 2b of the guide post 2 is inserted in the hole 1c of the base 1, while the outer-diameter portion 2a of the guide post 2 is chucked by a hole portion 8a of a jig 8. To minimize the inclination of a central axis O of the inner-diameter portion 3a of the bush 3 and that of a central axis O' of the outer-diameter portion 2a of the guide post 2, the relative inclination between the shaft portion 5a of the jig 5 and the hole portion 8a of the jig 8 is adjusted within ±5 minutes in angle, and the clearance between the shaft portion 5a of the jig 5 and the inner-diameter portion 3a is set to approximately several $\mu$m so that almost no clearance occurs.

Since the relative position and angle between the inner-diameter portion 3a of the bush 3 and the guide post 2 are determined by the jigs 5 and 8, the clearance between the hole 1c of the base 1 and the smaller-diameter portion 2b of the guide post 2 need not be made so small as a clearance due to caulking with a so-called high speed steel pin or the like, and may be set to approximately 200–600 $\mu$m.

In the state of this setting, laser beams are projected onto the portions B (the fused portions) from the directions indicated by arrows $D_1$ and $D_2$ by a laser projection machine (not shown). In plan view, as shown in FIG. 3, the laser beams are projected from three directions indicated by arrows $C_1$, $C_2$ and $C_3$. The projection angle of each of the laser beams is preferably approximately 45° with respect to each of the base 1 and the guide post 2. As the kind of laser, YAG laser is suitable.

In a portion E, after the base 1 and the guide post 2 have been fused together by the projection of the laser beams, the base 1 and the guide post 2 are fixed to each other by hardening. Since no unnecessary external force is applied to the base 1 nor the guide post 2 during such fixing process, neither the base 1 nor the guide post 2 undergoes a deformation, a relative positional deviation or the like. Accordingly, it is possible to restrain the inclination of the central axis O' of the guide post 2 with respect to the central axis O within the clearance between the shaft portion 5a of the jig 5 and the inner-diameter portion 3a of the bush 3.

Since the base 1 and the guide post 2 are fastened to each other by being fused together, the base 1 and the guide post 2 can be fastened with a fastening strength which is remarkably stronger than fastening strength obtainable from fastening using caulking. Accordingly, it is possible to solve a problem such as the problem that component parts come off as the result of insufficient caulking or the like, thereby making it possible to provide a tape guide device of stable quality.

As described above, in accordance with the present embodiment, since the base 1 and the guide post 2 are fixed to each other by being fused together by laser, the outer-diameter portion of the peripheral portion of the hole 1c of the base 1 can be made thin to a size having the minimum necessary strength.

Since the inner-diameter portion 3a of the bush 3 and the guide post 2 are respectively securely held by the shaft portion 5a of the jig 5 and the hole portion 8a of the jig 8 while laser beams are being projected, it is possible to inhibit the occurrence of the relative inclination between the inner-diameter portion 3a and the guide post 2, thereby making it possible to fix the base 1 and the guide post 2 to each other with high accuracy.

Accordingly, in accordance with the present embodiment, it is possible to provide a tape guide device which is suited to a recording and/or reproducing apparatus of reduced size and is improved in reliability.

Incidentally, the present invention is not limited to only a tape guide device, and can be effectively applied to any fitting structure in which a pin member is erected on a base member, particularly, a structure which is limited in layout space but requires high accuracy. For example, the present invention may be applied to a structure in which a gear is fitted on a pin member or to a structure which uses a crankpin instead of a pin member.

What is claimed is:

1. A tape guide device for guiding a tape in a recording and/or reproducing apparatus, comprising:
   (a) a base in which a hole is formed; and
   (b) a guide post, for guiding the tape, having at one end thereof a smaller-diameter portion than a tape guiding portion, a part of the smaller-diameter portion inserted in the hole of said base, the smaller-diameter portion of said guide post and said base fused to each other by a laser beam on one side of said base on which said guide post is provided, and the smaller-diameter portion also extended on said base so as to form a space, and a slope surface formed at a border part of the smaller-diameter portion and the tape guiding portion of said guide post in the space and sloped upward in a direction away from the base for permitting irradiating of the laser beam from a position above the base.

2. A tape guide device according to claim 1, wherein the smaller-diameter portion of said guide post and said base are fused to each other at a plurality of positions.

3. A tape guide device according to claim 1, wherein said base has an external shape like an arc in a portion on which said guide post is erected, the arc being approximately equal in radius to said guide post.

4. A tape guide device according to claim 1, wherein a lower end portion of the smaller-diameter portion is positioned within the thickness of said base.

5. A tape guide device according to claim 1, wherein the hole of said base is 200–600 $\mu$m larger in diameter than the smaller-diameter portion.

6. A recording and/or reproducing apparatus comprising:
   (a) a rotary cylinder having a plurality of heads for recording and/or reproducing recording information on and/or from tape;
   (b) cassette mounting means for mounting a cassette in which tape is accommodated; and
   (c) a tape guide device for guiding a tape, including;
      a base in which a hole is formed; and
      a guide post, for guiding the tape, having at one end thereof a smaller-diameter portion than a tape guiding portion, a part of the smaller-diameter portion inserted in the hole of said base, the smaller-diameter portion of said guide post and said base fused to each other by a laser beam on one side of said base on which said guide post is provided, the smaller-diameter portion also extended on said base so as to form a space, and a slope surface formed at a border part of the smaller-diameter portion and the tape guiding portion of said guide post in the space sloped upward in a direction away from said base for permitting irradiating of the laser beam from a position above the base.

7. A recording and/or reproducing apparatus according to claim 6, wherein the smaller-diameter portion of said guide post and said base are fused to each other at a plurality of positions.

8. A recording and/or reproducing apparatus according to claim 6, wherein said base has an external shape like an arc in a portion on which said guide post is erected, the arc being approximately equal in radius to said guide post.

9. A recording and/or reproducing apparatus according to claim 6, wherein a lower end portion of the smaller-diameter portion is positioned within the thickness of said base.

10. A recording and/or reproducing apparatus according to claim 6, wherein the hole of said base is 200–600 $\mu$m larger in diameter than the smaller-diameter portion.

* * * * *

UNITED STATES PATENT AND TRADEMARK OFFICE
CERTIFICATE OF CORRECTION

PATENT NO. : 6,441,989 B2
DATED : August 27, 2002
INVENTOR(S) : Osamu Nagatsuka

It is certified that error appears in the above-identified patent and that said Letters Patent is hereby corrected as shown below:

<u>Column 6,</u>
Line 24, after "guiding" delete "a".

Signed and Sealed this

Twenty-eighth Day of October, 2003

JAMES E. ROGAN
*Director of the United States Patent and Trademark Office*